United States Patent
Katayama

(10) Patent No.: US 12,259,571 B2
(45) Date of Patent: Mar. 25, 2025

(54) LIGHT GUIDE PLATE AND LIGHT EMITTING DEVICE USING SAME

(71) Applicant: MITSUBISHI HEAVY INDUSTRIES THERMAL SYSTEMS, LTD., Tokyo (JP)

(72) Inventor: Yasuo Katayama, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 18/569,687

(22) PCT Filed: May 25, 2022

(86) PCT No.: PCT/JP2022/021335
§ 371 (c)(1),
(2) Date: Dec. 13, 2023

(87) PCT Pub. No.: WO2022/264764
PCT Pub. Date: Dec. 22, 2022

(65) Prior Publication Data
US 2024/0288623 A1  Aug. 29, 2024

(30) Foreign Application Priority Data
Jun. 18, 2021  (JP) .................. 2021-101564

(51) Int. Cl.
*F21V 8/00* (2006.01)
(52) U.S. Cl.
CPC ......... *G02B 6/0046* (2013.01); *G02B 6/0051* (2013.01)
(58) Field of Classification Search
CPC .. G02B 6/0045; G02B 6/0046; G02B 6/0048; F21V 2200/20
See application file for complete search history.

(56) References Cited

U.S. PATENT DOCUMENTS 6,022,117 A * 2/2000 Tenmyo ............... G02B 6/0055
                                                                  362/17
2006/0083013 A1    4/2006 Wanninger et al.
(Continued)

FOREIGN PATENT DOCUMENTS

JP    2006-66399 A    3/2000
JP    2006-166378 A   6/2006
(Continued)

OTHER PUBLICATIONS

International Search Report for International Application No. PCT/JP2022/021335, dated Jun. 28, 2022, with English translation.
(Continued)

*Primary Examiner* — Sean P Gramling
(74) *Attorney, Agent, or Firm* — Birch, Stewart, Kolasch & Birch, LLP

(57) ABSTRACT

The purpose of the present invention is to provide a light guide plate with which it is possible to prevent light unevenness and improve appearance, and a light emitting device using the same. A light guide plate (11) is provided with: a light incidence surface (12) on which light is incident; a light emission surface (13) which faces the light incidence surface (12) and from which light incident from the light incidence surface (12) is emitted; and a flat plate-shaped light guide member (14) which guides the light incident from the light incidence surface (12) to the light emission surface (13). The light guide member (14) has a widened portion (16) that is widened outward in a plate width direction from the light incidence surface (12) toward the light emission surface (13), and in a cross-section parallel to the light emission surface (13) on the light emission surface (13) side of the light guide member (14), the light guide member (14) has a larger plate thickness at least on one end side in the plate
(Continued)

width direction on the side farther from the light incidence surface (12) than the plate thicknesses of the other portions.

16 Claims, 7 Drawing Sheets

(56) References Cited

U.S. PATENT DOCUMENTS

2009/0129080 A1    5/2009   Wanninger et al.
2009/0237910 A1    9/2009   Takada et al.

FOREIGN PATENT DOCUMENTS

| JP | 2009-223196 A | 10/2009 |
| JP | 2020-13707 A | 1/2020 |
| JP | 2020-155265 A | 9/2020 |

OTHER PUBLICATIONS

Written Opinion of the International Searching Authority for International Application No. PCT/JP2022/021335, dated Jun. 28, 2022, with an English translation.

* cited by examiner

LIGHT GUIDE PLATE AND LIGHT EMITTING DEVICE USING SAME

TECHNICAL FIELD

The present disclosure relates to a light guide plate and a light emitting device using the same.

BACKGROUND ART

In general, an indicator device or an illumination device includes a light source using a light emitting diode (LED), a lamp, or the like, and a light guide plate using a transparent acrylic resin, a transparent polycarbonate resin, or the like. Light emitted from the light source is made incident on a light incidence surface of the light guide plate, and the light is guided into the light guide plate and emitted to the outside from a light emission surface, whereby the light is used for illuminated display or illumination.

As this type of indicator device, for example, Patent Document 1 discloses an indicator device used in an electronic apparatus such as AV equipment.

CITATION LIST

Patent Literature

Patent Document 1: JP 2009-223196 A

SUMMARY OF INVENTION

Technical Problem

Here, with reference to FIG. 7, a problem that occurs in a light guide plate in which the plate thickness of a light guide member on a light emission surface side is constant in a plate width direction will be described. FIG. 7 is a perspective view illustrating a light guide plate as a reference example.

A light guide plate 111 illustrated in FIG. 7 includes a light incidence surface 112 on which light is incident, a light emission surface 113 that faces the light incidence surface 112 and emits the light incident from the light incidence surface 112, and a light guide member 114 that has a flat plate shape and guides the light incident from the light incidence surface 112 to the light emission surface 113.

The light guide member 114 includes a light incidence portion 115, a widened portion 116, and a light emission portion 117. The light incidence portion 115 is formed with the light incidence surface 112, and the light emission portion 117 is formed with the light emission surface 113. In the widened portion 116, the plate width of the light guide member 114 is widened outward in the plate width direction from the light incidence surface 112 toward the light emission surface 113. The light emission portion 117 is provided with a shape (protrusion 118) protruding toward a direction in which light is emitted, and the light emission surface 113 is formed on a side of the protrusion 118 from which light is emitted. The plate thickness of the light guide member 114 on the light emission surface 113 side is constant in the plate width direction.

The light guide plate 111 is provided with a light source 102 that emits light to the light incidence surface 112 at a position facing the light incidence surface 112. The light source 102 is disposed so as to be positioned at a center of the light incidence surface 112 in the width direction. Light emitted from the light source 102 is incident on the light guide plate 111 from the light incidence surface 112, propagates inside the light guide member 114, and then is emitted to the outside from the light emission surface 113.

At this time, on the light emission surface 113 side of the light guide member 114, while the light from the light source 102 is sufficiently guided to a central portion of the light guide plate 111 in the plate width direction, it is difficult to sufficiently guide the light from the light source 102 to end portions of the light guide plate 111 in the plate width direction. As a result, since the central portion of the light emission surface 113 is likely to be lighted while the end portions thereof are less likely to be lighted, there is a problem in that brightness cannot be uniform over the entire plate width direction and light unevenness occurs.

In Patent Document 1, the light guide plate is provided with a triangular recess for reflecting light at a position near the light source, but the light unevenness on the light emission surface 113 side of the light guide member 114 is not sufficiently taken into account.

The present disclosure has been made in view of the above-described circumstances, and an object thereof is to provide a light guide plate that can prevent light unevenness and improve appearance, and a light emitting device using the light guide plate.

Solution to Problem

In order to solve the above problem, a light guide plate of the present disclosure includes: a light incidence surface on which light is incident: a light emission surface facing the light incidence surface, the light emission surface configured to emit the light incident from the light incidence surface; and a light guide member having a flat plate shape, the light guide member configured to guide the light incident from the light incidence surface to the light emission surface. The light guide member includes a widened portion that is widened outward in a plate width direction from the light incidence surface toward the light emission surface. In a cross section parallel to the light emission surface on the light emission surface side of the light guide member, the plate thickness of the light guide member is thicker at least on one end side in the plate width direction on a side farther from the light incidence surface than at other portions.

Advantageous Effects of Invention

In the light guide plate according to the present disclosure, in a cross section parallel to the light emission surface on the light emission surface side of the light guide member, the plate thickness of the light guide member is thicker at least on one end side in the plate width direction on a side farther from the light incidence surface than at other portions. Thus, light can be sufficiently guided to end portions of the light guide plate in the plate width direction (particularly, an end portion on the side farther from the light incidence surface). Accordingly, compared to a case where the plate thickness of the light guide member on the light emission surface side is constant entirely in the plate width direction, brightness can be made more uniform over the entire plate width direction, and light unevenness can be prevented. As a result, the appearance is improved.

DESCRIPTION OF EMBODIMENTS

An embodiment of a light guide plate and a light emitting device using the light guide plate according to the present disclosure will be described below with reference to the drawings.

In the following embodiment, a case in which a light emitting device is applied to an operation switch of a vehicular air conditioning device will be described as an example, but the present disclosure is not limited thereto.

First Embodiment

A first embodiment of the present disclosure will be described below using FIG. 1.

Figure 1:
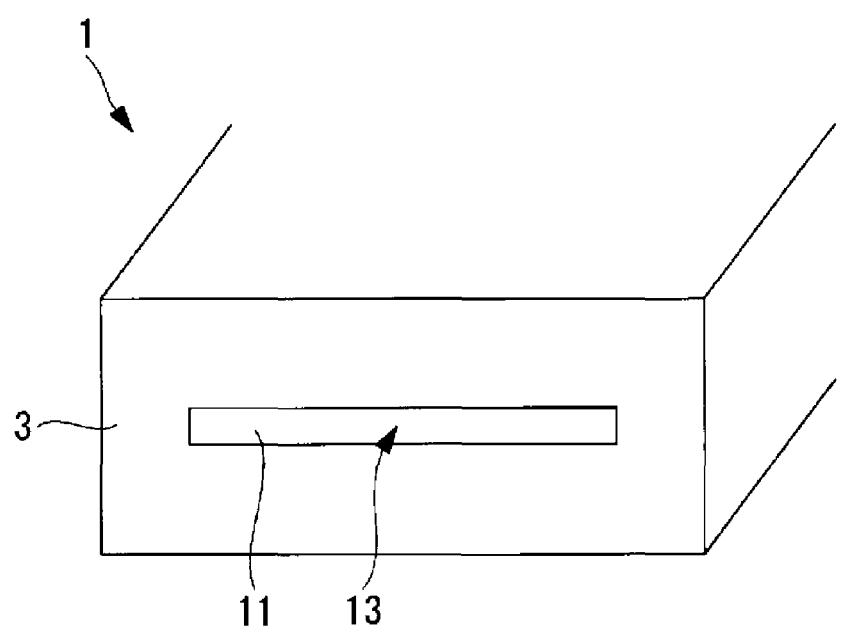
FIG. 1 is a perspective view illustrating a light emitting device according to a first embodiment of the present disclosure.

FIG. 1 is a perspective view illustrating an operation switch of a vehicular air conditioning device as a light emitting device 1 according to the present embodiment. The operation switch is used to adjust the temperature and the air flow rate of the vehicular air conditioning device, or the like.

The light emitting device (operation switch) 1 includes a case 3, a light guide plate 11, and a light source (not illustrated in FIG. 1) provided inside the case 3. The light guide plate 11 is disposed such that a light emission surface 13 that emits light is flush with a front surface (design surface) of the case 3. In the operation switch 1, light is emitted from the light source (not illustrated in FIG. 1), and the emitted light passes through the light guide plate 11 and is emitted from the light emission surface 13 to the outside. In this way, the operation switch 1 is configured such that the location of the operation switch 1 can be recognized even at night.

Next, the light guide plate 11 according to the present embodiment will be described using FIGS. 2 and 3.

Figure 2:
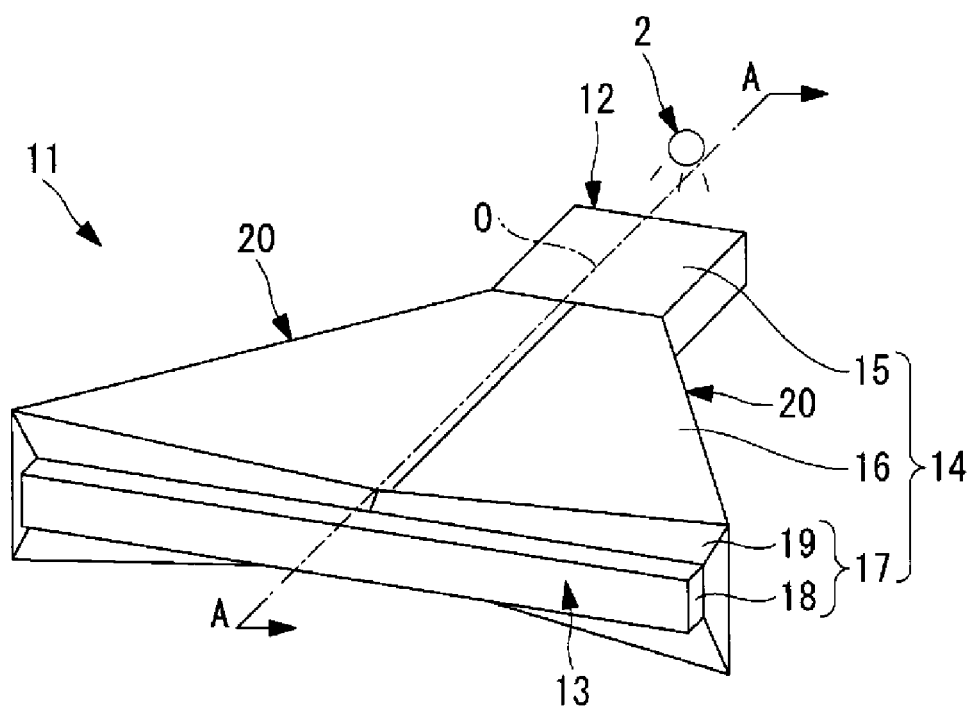
FIG. 2 is a perspective view illustrating a light guide plate according to the first embodiment of the present disclosure.
Figure 3:
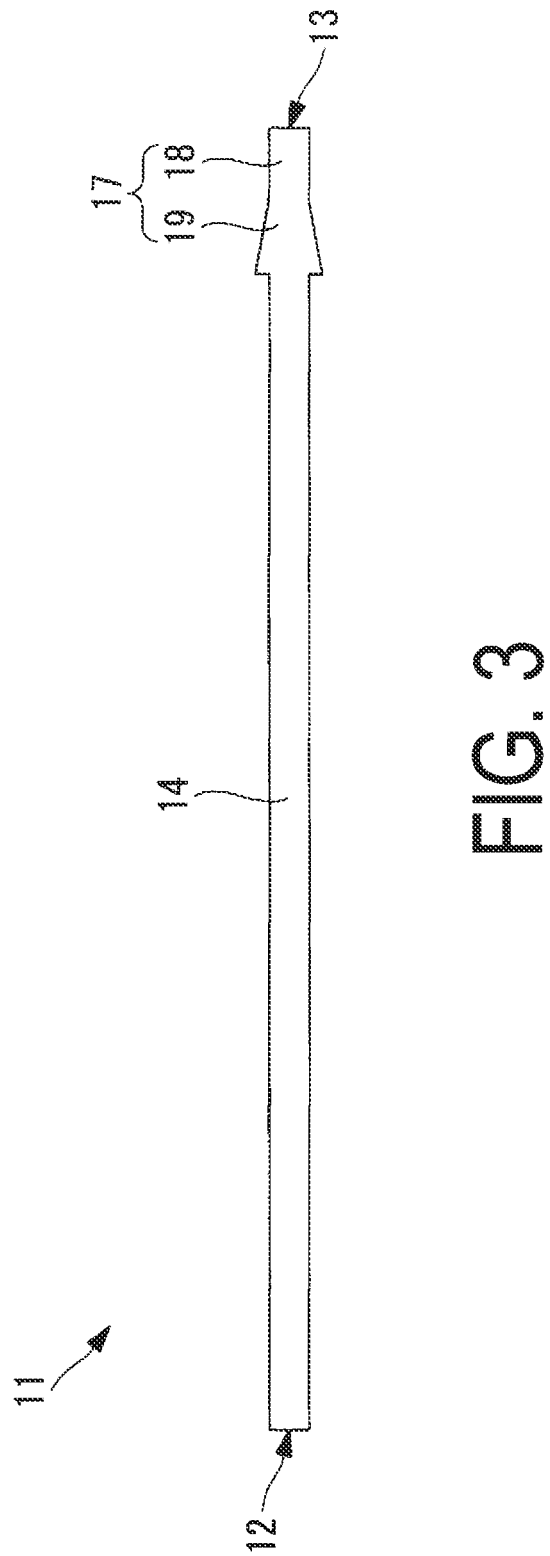
FIG. 3 is a vertical cross-sectional view illustrating the light guide plate according to the first embodiment of the present disclosure.

FIG. 2 is a perspective view illustrating the light guide plate according to the present embodiment, and FIG. 3 is a cross-sectional view of the light guide plate, taken along A-A in FIG. 2. A cutting plane A-A is a vertical plane including a center line O passing through the center of the light guide plate 11 in the width direction. The light guide plate 11 includes a light incidence surface 12 on which light is incident, a light emission surface 13 that faces the light incidence surface 12 and emits the light incident from the light incidence surface 12, and a light guide member 14 that has a flat plate shape and guides the light incident from the light incidence surface 12 to the light emission surface 13. The light incidence surface 12 and the light emission surface 13 are parallel to each other. The light guide member 14 is made of a material that transmits visible light, such as acrylic (polymethyl methacrylate (PMMA)).

The light guide member 14 includes a light incidence portion 15, a widened portion 16, and a light emission portion 17. The light incidence portion 15 is formed with the light incidence surface 12, and the light emission portion 17 is formed with the light emission surface 13. The widened portion 16 is formed between the light incidence portion 15 and the light emission portion 17. In the widened portion 16, the plate width of the light guide member 14 is gradually widened outward in the plate width direction (on both sides in the plate width direction) from the light incidence surface 12 toward the light emission surface 13. The plate thickness of the widened portion 16 is constant at the central portion in the plate width direction, and gradually increases on both sides in the plate thickness direction from the light incidence surface 12 toward the light emission surface 13 at both end portions in the plate width direction.

The light emission portion 17 is provided with a shape (protrusion 18) protruding toward a direction in which light is emitted, and the light emission surface 13 is formed on a side of the protrusion 18 from which light is emitted. The widened portion 16 and the protrusion 18 are connected by an inclined connection portion 19. A side end portion of the inclined connection portion 19 is connected to the widened portion 16. In a cross section parallel to the light emission surface 13, the plate thickness of the side end portion of the inclined connection portion 19 gradually increases from the central portion in the plate width direction toward both end sides in the plate width direction. The inclined connection portion 19 is inclined such that the plate width is narrowed inward in the plate width direction and the plate thickness is reduced toward the protrusion 18 side. The light emission portion 17 includes the protrusion 18 and the inclined connection portion 19.

The light guide plate 11 has a shape symmetrical with respect to the cutting plane A-A (the vertical plane including the center line O).

According to the configuration described above, in a cross section parallel to the light emission surface 13, the plate thickness of the light guide member 14 on the light emission surface 13 side is thicker on both end sides in the plate width direction than at other portions. Specifically, the plate thickness on the both end sides in the plate width direction is thicker than the plate thickness at the central portion in the plate width direction. Note that the light emission surface 13 side of the light guide member 14 refers to a side closer to the light emission surface 13 than to the light incidence surface 12 in the light guide member 14.

The light guide plate 11 is provided with a light source 2 that emits light to the light incidence surface 12 at a position facing the light incidence surface 12. The light source 2 is positioned at the center of the light incidence surface 12 in the width direction, specifically on the center line O. Light emitted from the light source 2 is incident on the light guide plate 11 from the light incidence surface 12, propagates inside the light guide member 14, and then is emitted to the outside from the light emission surface 13. As the light source 2, a light emitting diode (LED) is mainly used.

As illustrated in FIG. 3, in the light guide plate 11, the plate thickness at the light incidence surface 12 is equal to the plate thickness at the light emission surface 13. The inclined connection portion 19 is formed so as to protrude from upper and lower surfaces of the light guide member 14, and in FIG. 3, the plate thickness of the inclined connection portion 19 is made thicker than the thickness of other portions.

In order to further facilitate the diffusion of the light emitted from the light source 2, a diffusion material that diffusely reflects the light may be added to the light guide member 14. The diffusion material may be provided so as to be dispersed throughout the light guide member 14. Examples of the diffusion material include beads. The beads may have a particle size of about 10 μm, and may be made of, for example, silicone resin.

In order to further diffuse the light on both end sides of the light emission portion 17 in the plate width direction, the diffusion material may be provided such that the amount of the diffusion material is greater on the both sides in the plate width direction than on the center side in the plate width direction in the light guide member 14 (the density of the diffusion material is greater on the both end sides than on the center side). In that case, the light guide member 14 can be made by molding a center side resin having a low particle density of the diffusion material and an outer side resin having a high particle density of the diffusion material in two colors.

Side surfaces (side surfaces facing outward in the plate width direction) 20 (see FIG. 2) of the widened portion 16 may be provided with an uneven shape. Examples of the uneven shape include a saw-toothed shape (jagged shape) and a shape in which small unevenness spreads all over a surface (rough shape).

The actions and effects exhibited by the light guide plate 11 according to the present embodiment above will be described.

In the light guide plate 11 according to the present embodiment, in a cross section parallel to the light emission surface 13 on the light emission surface 13 side of the light guide member 14, the plate thickness of the light guide member 14 is thicker on the both end sides in the plate width direction than at other portions (for example, central portion in the plate width direction). Therefore, light can be sufficiently guided to the end portions of the light guide plate 11 in the plate width direction. Accordingly, compared to a case where the plate thickness of the light guide member 14 on the light emission surface 13 side is constant in the plate width direction, brightness can be made more uniform over the entire plate width direction, and light unevenness can be prevented. As a result, the appearance is improved.

In particular, light can be sufficiently guided to the both end portions of the light guide member 14 as compared to a case where only one end side in the plate width direction is thicker than other portions. This can more reliably prevent light unevenness.

When the uneven shape is provided on the side surfaces 20 of the widened portion 16, light incident from the light incidence surface can be diffusely reflected by the side surfaces 20 and guided to the light emission surface 13. Accordingly, diffuse reflection can be facilitated.

When the diffusion material is provided overall, the diffuse reflection can be facilitated, and thus light can be more uniformly emitted from the light emission surface 13 of the light guide plate 11.

Since the light emitting device 1 according to the present embodiment includes the light guide plate 11 described above, light can be emitted from the light emission surface 13 without unevenness.

Second Embodiment

A second embodiment of the present disclosure will be described below using FIG. 4.

The basic configuration of the present embodiment is different from the basic configuration of the first embodiment in that a light guide member 34 is used instead of the light guide member 14. In the light guide member 34, the plate thickness on the light emission surface 13 side is thicker only on one end side in the plate width direction than at other portions. More specifically, a light guide plate 31 of the present embodiment has a shape obtained by halving the light guide plate 11 of the first embodiment along the cutting plane A-A. The other components are basically the same as those of the first embodiment described above. Therefore, in the present embodiment, this different part will be described, and the description of the other overlapping parts will be omitted.

The same components as those in the first embodiment are denoted by the same reference signs, and detailed description thereof will be omitted.

Figure 4:
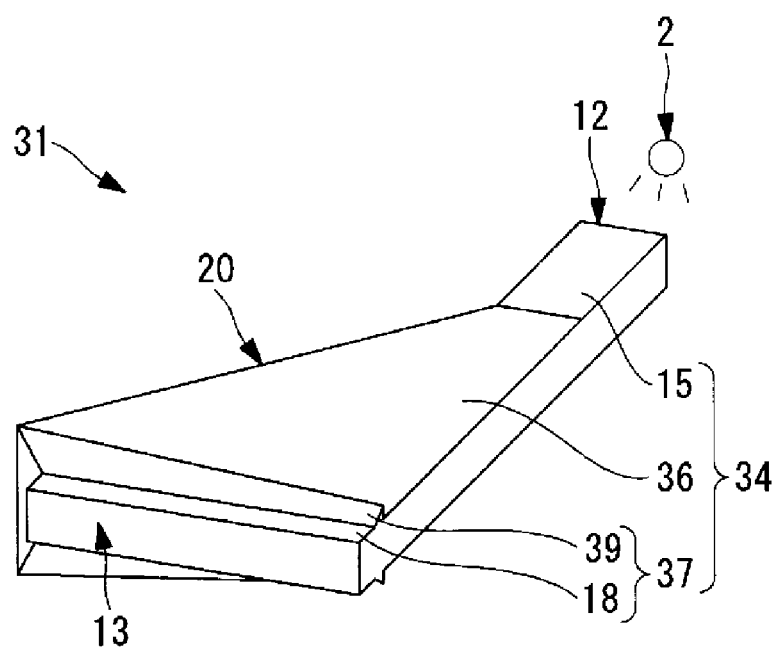
FIG. 4 is a perspective view illustrating a light guide plate according to a second embodiment of the present disclosure.

FIG. 4 is a perspective view illustrating the light guide plate 31 according to the present embodiment. The light guide member 34 of the present embodiment includes the light incidence portion 15, a widened portion 36, and a light emission portion 37. The widened portion 36 is formed between the light incidence portion 15 and the light emission portion 37. In the widened portion 36, the plate width of the light guide member 34 is gradually widened outward in the plate width direction from the light incidence surface 12 toward the light emission surface 13 only on one side (a side father from the light incidence surface 12). In addition, the plate thickness of the widened portion 36 gradually increases in both sides in the plate thickness direction from the light incidence surface 12 toward the light emission surface 13 at an end portion on the one side (the side father from the light incidence surface 12) in the plate width direction, and is constant at an end portion on the other side (a side closer to the light incidence surface 12) in the plate width direction.

The widened portion 36 and the protrusion 18 are connected by an inclined connection portion 39. A side end portion of the inclined connection portion 39 is connected to the widened portion 36. In a cross section parallel to the light emission surface 13, the plate thickness of the side end portion of the inclined connection portion 39 gradually increases from the end portion on the other side (the side closer to the light incidence surface 12) in the plate width direction toward the end portion on the one side (the side farther from the light incidence surface 12) in the plate width direction. The inclined connection portion 39 is inclined such that the plate width is narrowed inward in the plate width direction only on the one side (the side farther from the light incidence surface 12) and the plate thickness is reduced toward the protrusion 18 side. The light emission portion 37 includes the protrusion 18 and the inclined connection portion 39.

According to the configuration described above, in a cross section parallel to the light emission surface 13, the plate thickness of the light guide member 34 on the light emission surface 13 side is thicker at least on one end side in the plate width direction on a side farther from the light incidence surface 12 than at other portions. Specifically, the plate thickness on the one end side in the plate width direction (the side farther from the light incidence surface 12) is thicker than the plate thickness on the other side in the plate width direction (the side closer to light incidence surface 12).

The actions and effects exhibited by the light guide plate 31 according to the present embodiment above will be described.

In the light guide plate 31 according to the present embodiment, in a cross section parallel to the light emission surface 13 on the light emission surface 13 side of the light guide member 34, the plate thickness of the light guide member is thicker on one end side in the plate width direction on a side farther from the light incidence surface 12 than at other portions. Therefore, light can be sufficiently guided to end portions of the light guide plate 31 in the plate width direction (particularly, an end portion on the side farther from the light incidence surface 12). Accordingly, compared to a case where the plate thickness of the light guide member 34 on the light emission surface 13 side is constant in the plate width direction, brightness can be made more uniform over the entire plate width direction, and light unevenness can be prevented. As a result, the appearance is improved.

Third Embodiment

A third embodiment of the present disclosure will be described below using FIGS. 5 and 6.

The basic configuration of the present embodiment is different from the basic configuration of the first embodiment in that a light guide member 54 is used instead of the light guide member 14 and in that the light guide member 54 is formed with a recess 61 on the light emission surface 13 side. In the light guide member 54, the plate thickness of a widened portion 56 in the plate width direction is constant with a partial exception. The other components are basically the same as those of the first embodiment described above. Therefore, in the present embodiment, these different parts will be described, and the description of the other overlapping parts will be omitted.

The same components as those in the first embodiment are denoted by the same reference signs, and detailed description thereof will be omitted.

Figure 5:
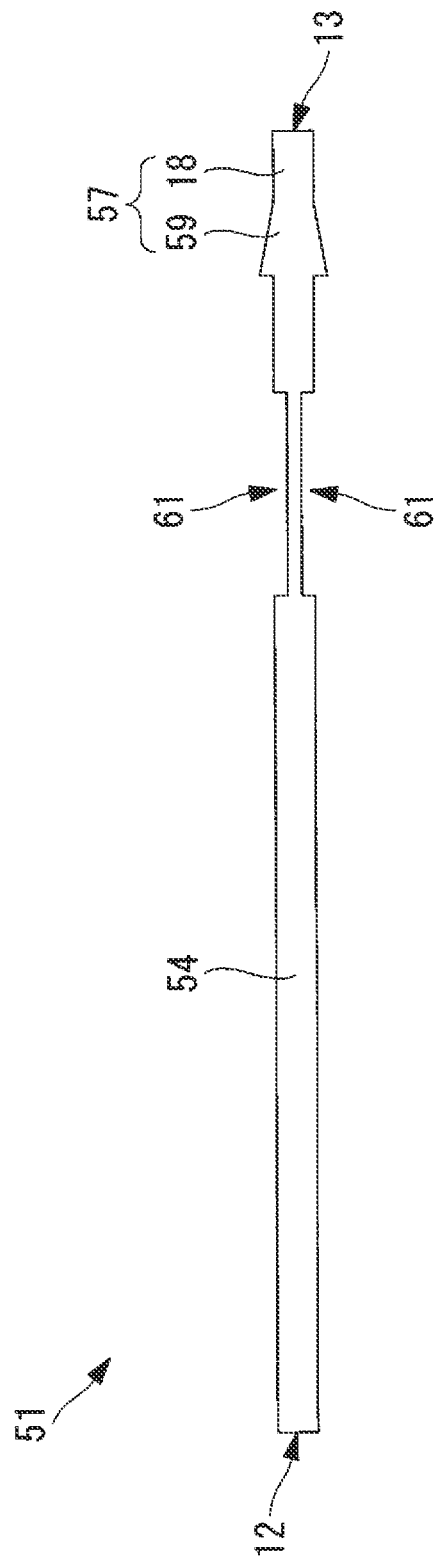
FIG. 5 is a vertical cross-sectional view illustrating a light guide plate according to a third embodiment of the present disclosure.
Figure 6:
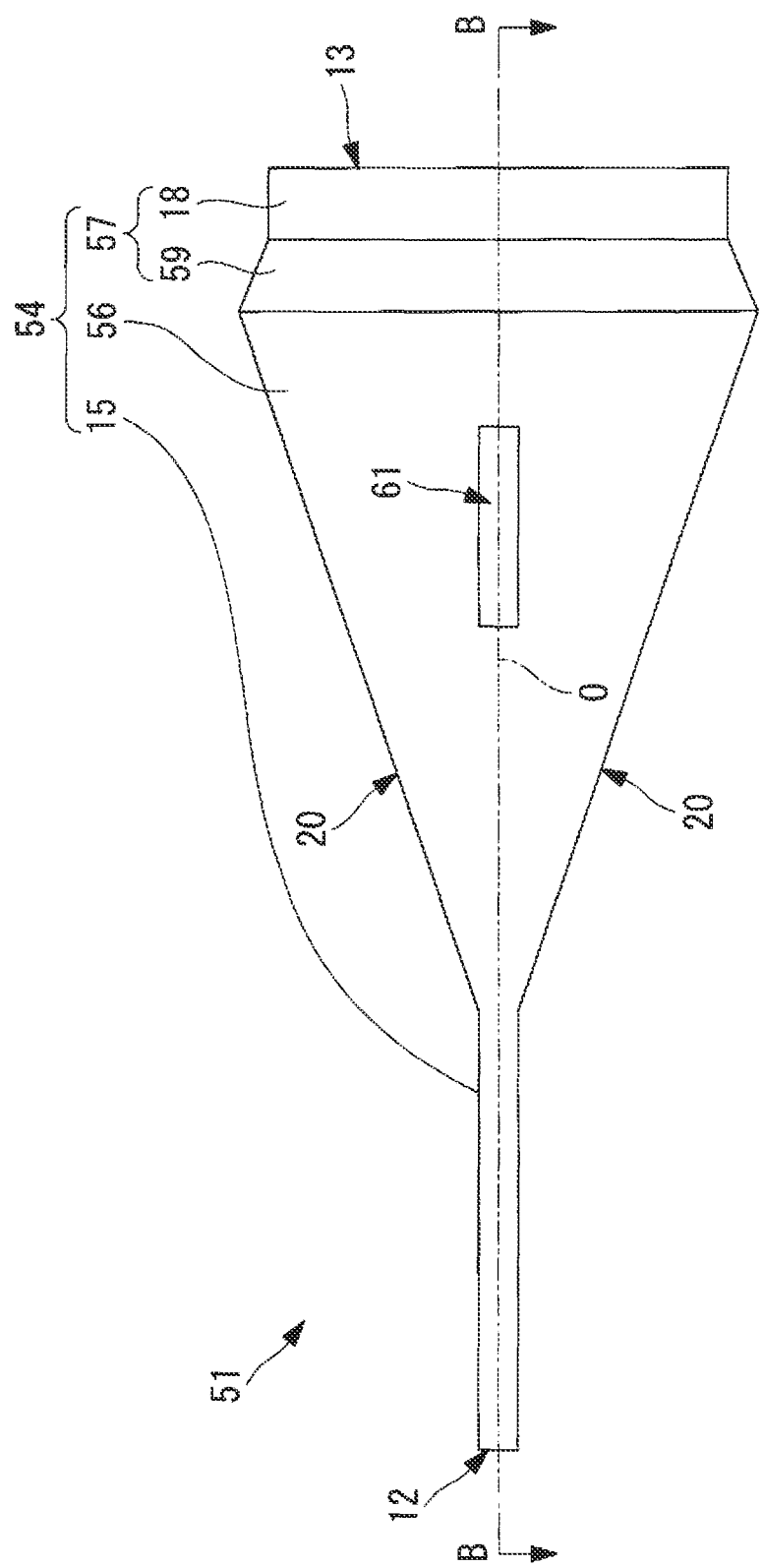
FIG. 6 is a top view illustrating the light guide plate according to the third embodiment of the present disclosure.
Figure 7:
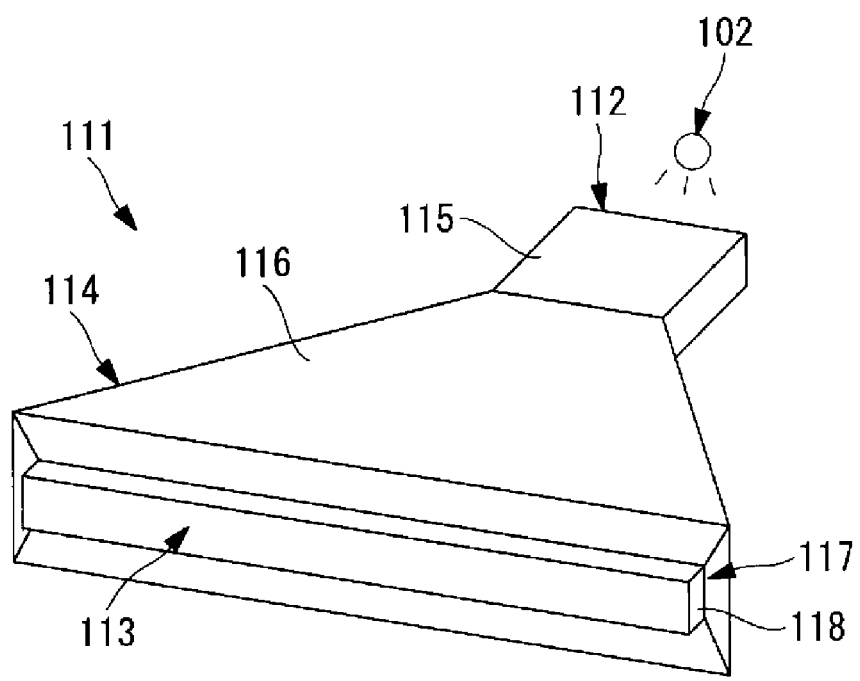
FIG. 7 is a perspective view illustrating a light guide plate as a reference example.

FIG. 5 is a vertical cross-sectional view illustrating a light guide plate 51 according to the present embodiment, and is a cross-sectional view taken along B-B in FIG. 6. A cutting plane B-B is a vertical plane including a center line O passing through the center of the light guide plate 51 in the width direction. FIG. 6 is a top view illustrating the light guide plate 51 according to the present embodiment. As illustrated in FIG. 6, the light guide member 54 of the present embodiment includes the light incidence portion 15, the widened portion 56, and a light emission portion 57. The widened portion 56 is formed between the light incidence portion 15 and the light emission portion 57. In the widened portion 56, the plate width of the light guide member 54 is widened outward in the plate width direction (on both sides in the plate width direction) from the light incidence surface 12 toward the light emission surface 13. The plate thickness of the widened portion 56 is constant from the light incidence surface 12 to the light emission surface 13 with a partial exception.

The widened portion 56 and the protrusion 18 are connected by an inclined connection portion 59. A side end portion of the inclined connection portion 59 is connected to the widened portion 56, and the plate thickness of the side end portion is constant in the plate width direction. The inclined connection portion 59 is inclined such that the plate width is narrowed inward in the plate width direction and the plate thickness is reduced toward the protrusion 18 side.

As illustrated in FIG. 6, on the light emission surface 13 side of the light guide member 54 in the widened portion 56, the recess 61 having a rectangular shape in a top view is formed at the central portion in the plate width direction. As illustrated in FIG. 5, the recess 61 is also formed at the lower surface of the light guide member 54 at a position corresponding to the recess 61 at the upper surface. With the recesses 61 formed at the upper and lower surfaces of the light guide member 54, the plate thickness of the light guide member 54 is thicker on both sides in the plate width direction than at other portions (the central portion in the plate width direction) in a cross section that is parallel to the light emission surface 13 and includes the recesses 61.

Note that, also in the light guide plate 51, the plate thickness at the light incidence surface 12 is equal to the plate thickness at the light emission surface 13.

The recess 61 is not limited to a recess that is recessed stepwise with respect to surrounding portions as illustrated in FIG. 5, but may be a recess that is formed to be gradually inclined in a slope shape with respect to the surrounding portions.

The actions and effects exhibited by the light guide plate 51 according to the present embodiment above will be described.

In the light guide plate 51 according to the present embodiment, the recesses 61 are formed on the light emission surface 13 side of the light guide member 54 in the widened portion 56. Thus, the plate thickness of the light guide member 54 is thicker on both sides in the plate width direction than the central portion in the plate width direction in a cross section that is parallel to the light emission surface 13 and includes the recesses 61. Accordingly, the plate thickness of a portion having good light guiding properties at the central portion in the plate width direction on the light emission surface 13 side of the light guide member 54 is thinner than the plate thicknesses of both end portions in the plate width direction, and thus light can be guided to the light emission surface 13 more uniformly over the entire plate width direction. Therefore, compared to a case where no recess 61 is formed, brightness can be made more uniform over the entire plate width direction, and light unevenness can be prevented. As a result, the appearance is improved.

The third embodiment above has described, as an example, a case of using the light guide member 54 in which the plate thickness of the widened portion 56 in the plate width direction is constant at portions where the recess 61 is not formed, but no such limitation is intended. Specifically, the light guide member 14 according to the first embodiment may be used instead of the light guide member 54, and the recess 61 may be formed at the light guide member 14.

In addition, each of the embodiments above has described, as an example, a case where the light guide plate is applied to an operation switch (on-vehicle switch) of a vehicular air conditioning device. However, the present invention is not limited thereto, and the light guide plate may be applied to a light emitting device without particular limitation as long as the light emitting device is used for linear illumination.

The light guide plate (11, 31, 51) described in each of the embodiments described above is understood as follows, for example.

A light guide plate of the present disclosure includes: a light incidence surface (12) on which light is incident: a light emission surface (13) facing the light incidence surface, the light emission surface emitting the light incident from the light incidence surface: and a light guide member (14, 34, 54) having a flat plate shape, the light guide member guiding the light incident from the light incidence surface to the light emission surface. The light guide member includes a widened portion (16, 36, 56) that is widened outward in a plate width direction from the light incidence surface toward the light emission surface. In a cross section parallel to the light emission surface on the light emission surface side of the light guide member, the plate thickness of the light guide member is thicker at least on one end side in the plate width direction on a side farther from the light incidence surface than at other portions.

In the light guide plate of the present disclosure, in a cross section parallel to the light emission surface on the light emission surface side of the light guide member, the plate thickness of the light guide member is thicker at least on one end side in the plate width direction on the side farther from the light incidence surface than at other portions. Therefore, light can be sufficiently guided to end portions of the light guide plate in the plate width direction (particularly, an end portion on the side farther from the light incidence surface). Accordingly, compared to a case where the plate thickness of the light guide member on the light emission surface side is constant in the plate width direction, brightness can be made more uniform over the entire plate width direction, and light unevenness can be prevented. As a result, the appearance is improved.

In the light guide plate of the present disclosure, in a cross section parallel to the light emission surface on the light emission surface side of the light guide member, the plate thickness of the light guide member may be thicker on both end sides in the plate width direction than at other portions.

When the plate thickness on both end sides in the plate width direction on the light emission surface side of the light guide member is configured to be thicker than the plate thicknesses of the other portions (for example, the central portion in the plate width direction), light can be sufficiently guided to both end portions of the light guide member as compared to a case where the plate thickness is thicker only on one end side in the plate width direction than at other portions. This can more reliably prevent light unevenness.

In the light guide plate of the present disclosure, an uneven shape may be provided on a side surface of the widened portion.

When the uneven shape is provided on a side surface of the widened portion, light incident from the light incidence surface can be diffusely reflected by the side surface and guided to the light emission surface. Accordingly, diffuse reflection can be facilitated.

In the light guide plate of the present disclosure, a diffusion material may be provided overall.

When the diffusion material is provided overall, the diffuse reflection can be facilitated, and thus light can be more uniformly emitted from the light emission surface of the light guide plate. Examples of the diffusion material include beads made of silicon resin.

In the light guide plate of the present disclosure, an end portion of the light guide member on the light emission surface side may have a shape protruding toward a direction in which light is emitted.

When the end portion of the light guide member on the light emission surface side has a shape protruding toward the direction in which light is emitted, for example, in the case of application to an on-vehicle switch, the light emission surface can be made flush with a design surface of the switch. This can improve the appearance of the switch.

A light emitting device (1) of the present disclosure includes the light guide plate described above, and a light source (2) that is provided at a position facing the light incidence surface of the light guide plate and emits light to the light incidence surface.

Since the light emitting device includes the light guide plate described above, light can be emitted from the light emission surface without unevenness. Therefore, the light emitting device of the present disclosure can be suitably used for an on-vehicle switch, for example.

REFERENCE SIGNS LIST

1 Light emitting device (operation switch)
2 Light source
3 Case
11, 31, 51 Light guide plate
12 Light incidence surface
13 Light emission surface
14, 34, 54 Light guide member
15 Light incidence portion
16, 36, 56 Widened portion
17, 37, 57 Light emission portion
18 Protrusion
19, 39, 59 Inclined connection portion
20) Side surface
61 Recess
O Center line

The invention claimed is:

1. A light guide plate comprising:
a light incidence surface on which light is incident;
a light emission surface facing the light incidence surface, the light emission surface configured to emit the light incident from the light incidence surface; and
a light guide member having a flat plate shape, the light guide member configured to guide the light incident from the light incidence surface to the light emission surface, wherein
the light guide member includes a widened portion widened outward in a plate width direction from the light incidence surface toward the light emission surface, and
in a cross section parallel to the light emission surface on the light emission surface side of the light guide member, a plate thickness of the light guide member gradually increases from an end portion on a side closer to the light incidence surface in the plate width direction toward an end portion on a side farther from the light incidence surface in the plate width direction.

2. The light guide plate according to claim 1, wherein an uneven shape is provided on a side surface of the widened portion.

3. The light guide plate according to claim 1, wherein a diffusion material is provided over an entirety of the light guide plate.

4. The light guide plate according to claim 1, wherein an end portion of the light guide member on the light emission surface side has a shape protruding toward a direction in which the light is emitted.

5. A light emitting device comprising:
the light guide plate according to claim 1; and
a light source provided at a position facing the light incidence surface of the light guide plate, the light source being configured to emit light to the light incidence surface.

6. A light guide plate comprising:
a light incidence surface on which light is incident;
a light emission surface facing the light incidence surface, the light emission surface configured to emit the light incident from the light incidence surface; and
a light guide member having a flat plate shape, the light guide member configured to guide the light incident from the light incidence surface to the light emission surface, wherein
the light guide member includes a widened portion widened outward in a plate width direction from the light incidence surface toward the light emission surface, and in a cross section parallel to the light emission surface on the light emission surface side of the light guide member, a plate thickness of the light guide member gradually increases from a central portion in the plate width direction toward both end sides in the plate width direction.

7. The light guide plate according to claim 6, wherein an uneven shape is provided on a side surface of the widened portion.

8. The light guide plate according to claim 6, wherein a diffusion material is provided over an entirety of the light guide plate.

9. The light guide plate according to claim 2, wherein a diffusion material is provided over an entirety of the light guide plate.

10. The light guide plate according to claim 6, wherein an end portion of the light guide member on the light emission surface side has a shape protruding toward a direction in which the light is emitted.

11. The light guide plate according to claim 2, wherein an end portion of the light guide member on the light emission surface side has a shape protruding toward a direction in which the light is emitted.

12. The light guide plate according to claim 3, wherein an end portion of the light guide member on the light emission surface side has a shape protruding toward a direction in which the light is emitted.

13. A light emitting device comprising:
the light guide plate according to claim 6; and
a light source provided at a position facing the light incidence surface of the light guide plate, the light source being configured to emit light to the light incidence surface.

14. A light emitting device comprising:
the light guide plate according to claim 2; and
a light source provided at a position facing the light incidence surface of the light guide plate, the light source being configured to emit light to the light incidence surface.

15. A light emitting device comprising:
the light guide plate according to claim 3; and
a light source provided at a position facing the light incidence surface of the light guide plate, the light source being configured to emit light to the light incidence surface.

16. A light emitting device comprising:
the light guide plate according to claim 4; and
a light source provided at a position facing the light incidence surface of the light guide plate, the light source being configured to emit light to the light incidence surface.

* * * * *